M. H. COLLINS.
Lamp-Burners.
No. 146,751.
2 Sheets--Sheet 1.
Patented Jan. 27, 1874.
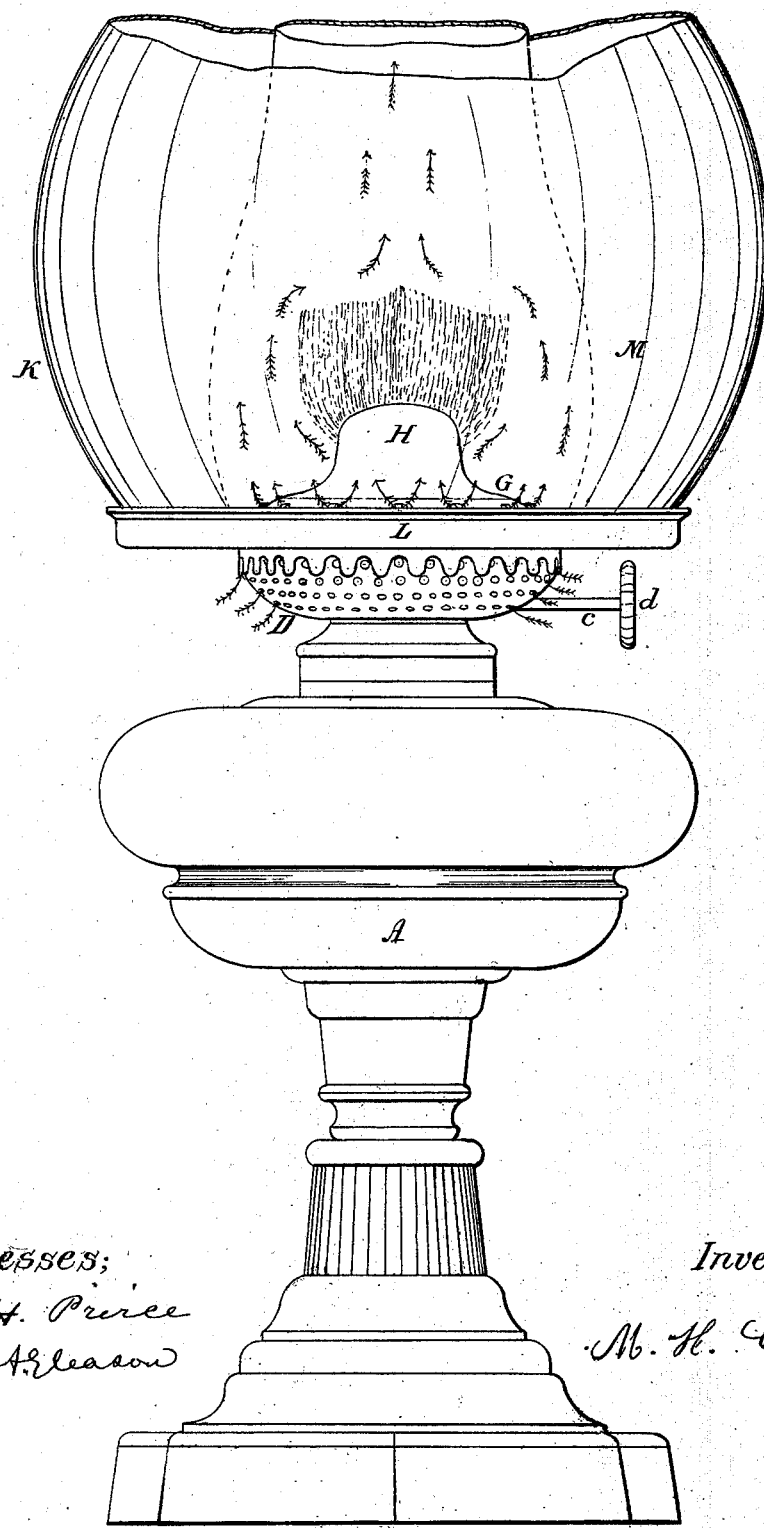
Witnesses:
E. H. Price
Dan A. Gleason
Inventor:
M. H. Collins 2 Sheets--Sheet 2.

M. H. COLLINS.
Lamp-Burners.

No. 146,751.    Patented Jan. 27, 1874.

Witnesses
E. H. Price
Dan A. Beason

Inventor:
M. H. Collins

UNITED STATES PATENT OFFICE.

MICHAEL H. COLLINS, OF CHELSEA, MASSACHUSETTS.

IMPROVEMENT IN LAMP-BURNERS.

Specification forming part of Letters Patent No. 146,751, dated January 27, 1874; application filed December 20, 1871.

*To all whom it may concern:*

Figure 4:
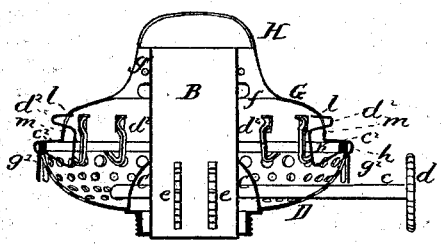
Figure 5:
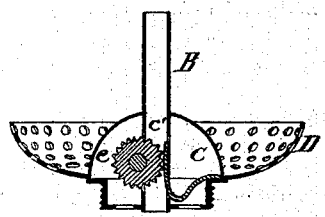
Figure 6:
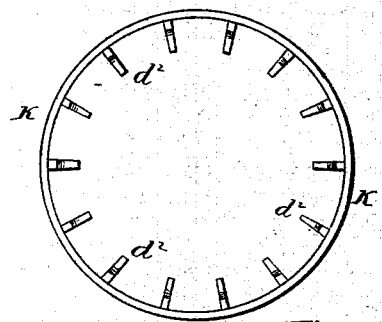
Figure 10:
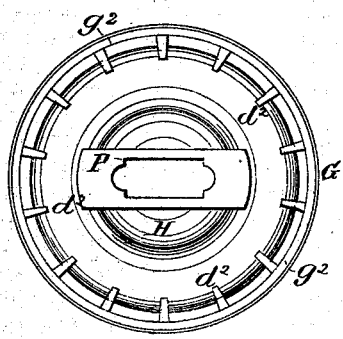
Figure 7:
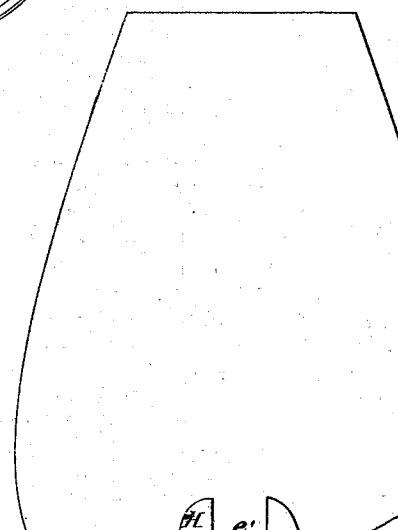
Figure 11:
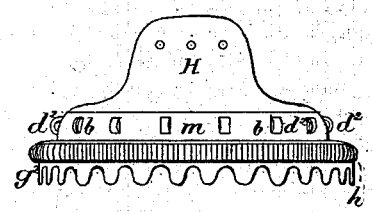
Figure 12:
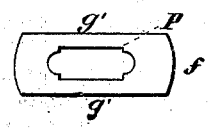
Figure 13:

Be it known that I, MICHAEL H. COLLINS, of Chelsea, in the county of Suffolk and State of Massachusetts, have invented certain new and useful Improvements in Lamps, or apparatus for the generation of light, of which the following is a specification:

In the accompanying drawings, Figure 1 denotes a side elevation of a lamp constructed in accordance with my invention, and having a globe applied thereto. Fig. 4 is a vertical and central section of the burner, taken lengthwise through the wick-tube. Fig. 5 is a vertical section of the screw-threaded foraminous base, the wick-tube, the wick elevating and retaining devices. Fig. 6 is a top view of the annular series of spring retainers. Fig. 7 is a view of the upper half or section of the burner, with the chimney as detached from the lower section or part. Fig. 10 is a bottom view of the upper half of the burner. Fig. 11 is a side view thereof. Fig. 12 is a top view of the horizontal deflector; and Fig. 13, a side view of the vertical deflector, such having the shape and construction to produce the outline of flame, as shown in Fig. 1.

The main or principal object had in view in making my invention is, to produce a simple, compact, and effective burner or apparatus for generating light by the combustion of a hydrocarbon fluid, whereby not only is the whole or nearly the whole light produced utilized, but the currents of air are so distributed or regulated as to produce the most thorough combustion of the gaseous and carbonaceous products of the flame, and thereby a light of the greatest steadiness, brilliancy, and purity is attained. Another object is, to construct the burner in such a manner as to cause the entering currents of air to so impinge against the wick-tube and the base of the solar cap as to maintain the said tube and base at such a low temperature as not only to prevent the formation of vapor in the reservoir of the lamp, but enable the cap and chimney to be removed from the wick-tube or lower part of the burner without burning the fingers of the operator.

In the drawings, A denotes the lamp-body or reservoir for holding the oil or fluid used in the generation of light. B is the wick-tube, which passes through and is secured to a hollow dome, C, screwed into the neck of the lamp. A shaft, $c$, goes through the dome C, and not only has a milled head, $d$, upon its outer end, but such shaft carries on it one or more toothed wheels, $e$, so disposed as to enter the wick-tube and wick when therein, and serve, when revolved by the shaft, to either raise or lower the wick, as may be desirable. Surrounding the dome or cap C, and affixed to the base thereof, is a concave foraminous air-distributer, D, the said parts being connected together and screwing into the neck of the lamp. G is the solar cap or upper half of the burner. This solar cap has a wide, long, open flame-passage, $e$, the main deflector being cut away so far that it shall not operate to direct the air against the ends of the flame—that is, about to the bottom of the cone or deflector proper, and some distance below the top of the wick-tube—the object of such construction being not only to allow a free unobstructed radiation of the entire amount of light generated by the ends of the flame, but to allow of the spreading or bellying out of the lower part of the flame. Another and important object attained is, that it allows the wick to be lowered, so as to produce the smallest area of light, and still emit a clear and bright flame, without smoke. A still further object attained is, that it enables the top of the cone to be brought down nearer to the top of the wick-tube, so that a very small amount of the light produced is hidden or lost.

For regulating or distributing the currents of air, and to give form to the light, I make use of the following means: At or near the bottom of the deflector proper or cone, and extending horizontally across the flame-passage, I arrange a perforated diaphragm or auxiliary deflector, $f$, through the center of which the wick-tube passes. $g\ g'$ are two vertical plates or auxiliary deflectors, which are affixed to the cone or deflector H on opposite sides of the flame-passage.

The horizontal deflector I prefer to dispose on line with the base of the flame-slot, and, in practical construction, the vertical and horizontal regulators or auxiliary deflectors may be connected together at their edges, or made from a single piece of metal. A slot or air-passage, P, is to be formed on each side of the wick-tube, the ends of the slot resting against the wick-tube, in order to maintain the cone or deflector H in its normal position with respect to the wick-tube.

I do not limit myself to the particular form or height of the auxiliary deflectors. They may be either plain or provided with any number of air-passages; but either the horizontal deflector or the vertical one must be provided with slots or air-passages disposed on opposite sides of the wick-tube. I would remark that, by varying the form of the auxiliary deflectors, any desired shape may be given to the flame of the lamp.

Care must be taken to have the air-passages in the horizontal deflector, or in the sides of the vertical deflectors, of sufficient length or size that large or equable currents of air may rush up and impinge against each side of the wick-tube and the flame thereon, in order to insure the best combustion, and give steadiness to the flame.

I have found, by experience, that in order to produce the best combustion of the fluid, and to obtain the most uniform and brilliant light, the main or larger currents of the air should be caused to impinge equably against opposite sides of the flame, near the lower plane of combustion, while smaller currents flow upward against opposite sides of the wick-tube, and against the sides of the flame, and that fresh portions should be carried and directed upon the flame above the top of the cone or main point of combustion, as shown by the arrows. The said solar cap or cone is formed with an annular ledge or shelf, on which the base of the chimney is to rest, while below the rest the cap is formed with a flange, $g$, which circumscribes and rests upon the outer edge of the air-distributer D, hereinbefore described.

When the lamp is to be used as a parlor lamp, I employ therewith a globe, K, which is held in position by means of a supporter, L, as shown in Fig. 1. M is the chimney, which is of a peculiar construction at its base, being formed with a contracted neck at such point. The chimney, above its base, may have any desired form to suit the form of flame created by the auxiliary deflectors, but it must have a contracted base to enable a series of knuckle-springs, $d^2$, to impinge against the interior thereof, and hold the chimney in position. These springs are formed of a single plate of metal, and extend radially from an annulus, $k$, as shown in Fig. 6. The said annulus is affixed to the interior surface of the base of the solar cap, and so that the knuckles of the springs may project through a corresponding series of holes, $t\ t$, &c., formed horizontally through the solar cap, and just above the plane of the chimney-rest $C^2$. This spring or series of springs may be used with chimneys having an external lip. In this case the springs are turned in a contrary direction from those last mentioned, so that the knuckles impinge on the outer surface of the chimney. The said solar cap rests upon the lower half of the burner, or the part carrying the wick-tube, and so as to be removed therefrom whenever desirable.

By my peculiar construction of the solar cap, and the application of the series of springs thereto, not only can the chimney be readily applied thereto or removed therefrom, but the chimney and the cap can be removed bodily (and together) from the lower part of the burner. The series of holes $t\ t$, formed through the part $m$ of the solar cap, should be of such size or height as not only to allow the knuckles of the springs to play freely through them, but permit currents of air to pass upward. A current of fresh unburnt air is thus furnished the flame above the top of the cap or cone at the point it is needed to effect as thorough a combustion of the gases evolved as possible.

From the above, it will be seen that while the lamp is in operation the air for the flame of the wick will enter the base of the burner through the foraminous air-distributer D in numerous currents, which, being directed against the wick-tube (or that part thereof above the dome C) and the bottom of the solar cap, will abstract much, if not all, the heat conducted from the flame by the wick-tube and cone or solar cap, whereby the wick-tube and the lower part of the solar cap will be maintained at so low a temperature as not only to enable the cap with the chimney to be removed from the lower part of the burner without burning the fingers of the operator, but prevent the formation of gas within the reservoir of the lamp. After having performed the office of abstracting heat from the parts, as described, the currents of air are distributed so as to produce the most thorough combustion of the fluid used in the generation of the flame, vertical currents passing up the slots in the horizontal diaphragm, and against the sides of the wick-tube, while the greater portions are deflected, and pass up into the chambers of the cone on opposite sides of the flame-slot, and either, in a body, impinge against the base of the flame, or, if the vertical deflectors are made with openings, a portion will escape through such openings, and impinge against the top part of the wick-tube, while a portion of the air which impinges against the bottom of the solar cap will pass up through the series of annular spring-ports to supply the flame above the cone with the necessary amount of oxygen to consume any escaping unconsumed gaseous or carbonaceous products.

Having described my invention, what I claim is as follows:

1. A solar cap or cone having a series of spring-ports disposed around its base, and a series of peripheral springs, constructed as described, and arranged within the interior of the cap, their free ends impinging against the surface of the chimney, in manner and for the purpose above set forth.

2. A lamp or apparatus for generating light, consisting essentially of the reservoir A, the wick-tube and its supporter, the foraminous air-inductor D, the chimney M, the cone or main deflector H, the auxiliary deflectors $f$ and $g$ $g'$, and the series of springs $d^2$, &c., the whole being constructed, combined, and arranged together in manner as set forth.

M. H. COLLINS.

Witnesses:
   E. H. PIERCE,
   DAN. A. GLEASON.